(12) United States Patent
Johnsgard

(10) Patent No.: US 7,854,792 B2
(45) Date of Patent: Dec. 21, 2010

(54) REACTIVE GAS CONTROL

(75) Inventor: Mark Johnsgard, Campbell, CA (US)

(73) Assignee: Airgard, Inc., San Jose, CA (US)

( * ) Notice: Subject to any disclaimer, the term of this patent is extended or adjusted under 35 U.S.C. 154(b) by 233 days.

(21) Appl. No.: 12/284,035

(22) Filed: Sep. 17, 2008

(65) Prior Publication Data

US 2010/0064891 A1     Mar. 18, 2010

(51) Int. Cl.
*B01D 47/00* (2006.01)
(52) U.S. Cl. .................. 95/216; 96/270; 96/271; 96/272; 96/273; 96/274; 96/322; 422/182; 422/183; 422/176
(58) Field of Classification Search .......... 95/224, 95/216; 96/270–277, 322–323; 261/111, 261/112.1; 422/168, 176, 182–183
See application file for complete search history.

(56) References Cited

U.S. PATENT DOCUMENTS

| | | | |
|---|---|---|---|
| 2,608,695 A | 9/1952 | Skibowski | |
| 3,544,086 A * | 12/1970 | Willett | 261/62 |
| 3,628,311 A * | 12/1971 | Costarella et al. | 96/228 |
| 3,681,895 A | 8/1972 | Zirngibl | |
| 3,690,044 A * | 9/1972 | Boresta | 96/273 |
| 3,841,061 A * | 10/1974 | Pike | 96/272 |
| 3,888,955 A | 6/1975 | Maruko | |
| 4,986,838 A | 1/1991 | Johnsgard | |
| 5,019,339 A | 5/1991 | Keeney et al. | |
| 5,271,908 A | 12/1993 | Shiban et al. | |
| 5,405,590 A | 4/1995 | Macedo | |
| 5,560,893 A | 10/1996 | Okino et al. | |
| 5,756,052 A | 5/1998 | Suzumura et al. | |
| 5,766,563 A | 6/1998 | Tanaka et al. | |
| 5,832,843 A | 11/1998 | Park | |
| 5,846,275 A | 12/1998 | Lane et al. | |
| 5,878,922 A | 3/1999 | Boring | |
| 5,882,366 A | 3/1999 | Holst | |

(Continued)

FOREIGN PATENT DOCUMENTS

DE     20 45 021 A1     3/1972

(Continued)

OTHER PUBLICATIONS

U.S. Appl. No. 10/804,764, filed Mar. 19, 2004, Mark Johnsgard, Apparatus and Method For Providing Heated Effluent Gases to a Scrubber.

(Continued)

*Primary Examiner*—Duane Smith
*Assistant Examiner*—Ives Wu
(74) *Attorney, Agent, or Firm*—Carr & Ferrell LLP

(57) ABSTRACT

Aspects include a valve comprising a flowing liquid, operable to control a flow of gas through a port. Certain aspects include reaction chambers operable to react gases, and in some aspects gases are substantially contained within an envelope comprised of a flowing liquid. Certain embodiments control gas entrance into a chamber with a valve comprised of a flowing liquid controlling gas flow through a port. Various gas scrubbing systems are described, including systems comprising reaction chambers operable to react gases that yield substantial amounts of solid reaction products. Methods for controlling gas flow are disclosed. Systems and methods include sequential steps of wet-scrubbing, reacting and further wet-scrubbing a gas stream.

20 Claims, 5 Drawing Sheets

U.S. PATENT DOCUMENTS

| | | |
|---|---|---|
| 5,927,957 A | 7/1999 | Kennedy et al. |
| 5,935,283 A | 8/1999 | Sweeney et al. |
| 5,955,037 A | 9/1999 | Holst |
| 6,029,100 A | 2/2000 | Iwashita et al. |
| 6,084,148 A | 7/2000 | Shiban et al. |
| 6,090,208 A | 7/2000 | Han |
| 6,322,756 B1 | 11/2001 | Arno |
| 6,331,281 B1 | 12/2001 | Teru et al. |
| 6,333,010 B1 | 12/2001 | Holst |
| 6,517,792 B2 | 2/2003 | Shimizu et al. |
| 6,530,977 B2 | 3/2003 | Seeley et al. |
| 6,759,018 B1 | 7/2004 | Arno et al. |
| 7,316,721 B1 | 1/2008 | Redden et al. |
| 7,550,123 B2 | 6/2009 | Temple et al. |
| 7,635,501 B2 | 12/2009 | Komai et al. |
| 2001/0001645 A1 | 5/2001 | Lee et al. |
| 2001/0009652 A1 | 7/2001 | Arno |
| 2001/0032543 A1 | 10/2001 | Seeley |
| 2004/0101460 A1 | 5/2004 | Arno et al. |
| 2004/0202596 A1 | 10/2004 | Honjo et al. |
| 2004/0213721 A1 | 10/2004 | Arno et al. |
| 2004/0216610 A1* | 11/2004 | Tom et al. ............... 95/149 |
| 2005/0031500 A1 | 2/2005 | Feng |
| 2005/0085057 A1 | 4/2005 | Hashikura et al. |
| 2006/0104878 A1 | 5/2006 | Chiu |
| 2007/0172398 A1 | 7/2007 | Clark |
| 2008/0233024 A1 | 9/2008 | Lindau et al. |

FOREIGN PATENT DOCUMENTS

| | | |
|---|---|---|
| EP | 0 429 942 A | 6/1991 |
| FR | 1 361 725 A | 5/1964 |
| GB | 1 328 990 A | 9/1973 |

OTHER PUBLICATIONS

U.S. Appl. No. 11/891,075, filed Aug. 8, 2007, Mark Johnsgard, Effluent Gas Scrubber and Method for Scrubbing Effluent Gasses.

Forderkennzeichen: 254 116 98. Thema: Verfahrensentwicklung zur Herstellung von Solar-Silicium im halbtechnischen Mabstab (Process Development for Manufacturing of Solar Silicon in Semi-Technical Scale), R. Kummel, & J. Danzig, Fraunhofer Institute Annual Report (Jun. 2002).

U.S. Appl. No. 12/567,459, filed Sep. 25, 2009, Mark Johnsgard, Effluent Gas Scrubbing.

U.S. Appl. No. 12/429,597, filed Apr. 24, 2009, Mark Johnsgard, Apparatus and Method For Providing Heated Effluent Gases to a Scrubber.

International Search Report and Written Opinion.

\* cited by examiner

REACTIVE GAS CONTROL

BACKGROUND

1. Technical Field

The present invention generally relates to the control and containment of gases, and more particularly to containing chemical reactions involving gases.

2. Description of Related Art

A variety of industrial processes create gas streams that must be scrubbed of contaminants before being released to the outside world. The manufacture of electronics, solar cells, display devices, communications devices, metals, ceramics, and polymers, as well as the processing of chemicals, drugs, and other materials, often requires the use of exhaust gas scrubbers. Scrubbers typically receive a substantially gaseous exhaust stream (sometimes containing fine particles) and remove contaminants from the gas stream before the stream is released to the environment.

Exhaust streams from electronic fabrication processes may include a variety of contaminants, including perfluorocarbons (PFCs) and etch gases such as $SF_6$, $NF_3$, $CF_4$, $C_2F_6$, $C_4F_8$, $COF_2$, and $C_4F_6$. Exhaust streams may include toxic hydrides such as $AsH_3$, $PH_3$, $P_2H_4$, or $B_2H_6$. Exhaust streams may also contain pyrophoric gases such as $SiH_4$, $Si_2H_6$, $GeH_4$, and gases such as $WF_6$, $SiF_4$, HCl, $BCl_3$, $Cl_2$, $TiCl_4$, $F_2$, HF, and various chlorosilanes.

Other industrial processes may also create toxic or polluting exhaust streams particular to a material or manufacturing process. Volatile organic compounds (VOCs) may be present in various petroleum refining processes, chemical reaction processes, or other organic synthesis reactors. Room or chamber ventilation (e.g., of a spray painting facility or an environment containing microbes or viruses) may also require exhaust gas scrubbing or other abatement.

Many contaminants require specific scrubbing procedures. Contaminants such as HCl, $Cl_2$, and $BCl_3$ are often soluble in water, and may often be removed using so-called wet scrubbers. Contaminants such as $SiCl_4$, $SiH_2Cl_2$, $NH_4F$, $WF_6$, $WCl_4$, and $TiCl_4$ (herein "water-reactive" contaminants) may or may not dissolve in water, depending upon various conditions. These contaminants may also react with water to form solid reaction products, which may clog various flow paths.

Another category of contaminants includes "water-insoluble" contaminants such as $SiH_4$, PFCs such as $CF_4$ and $C_2F_6$, $SF_6$, and $NF_3$. Among other deleterious characteristics, many of these contaminants are characterized by a "global warming potential," which may be hundreds or thousands of times stronger than that of $CO_2$ and reflecting a much stronger behavior as a greenhouse gas in the Earth's atmosphere.

Some contaminants are often abated by combusting the contaminant to form water-soluble reaction products that are then removed by wet scrubbing. Sometimes, such combustion requires high temperatures. For example, $NF_3$ may be combusted at temperatures above 900 degrees Celsius; $CF_4$ may be combusted at temperatures over 1200 degrees Celsius. Other contaminants such as $SiH_4$ may sometimes be reacted simply by exposing the contaminant to an oxygen source.

Water-insoluble contaminants may form reaction products (e.g., HF) that may be removed by wet scrubbing the reacted gas stream. Other water-insoluble contaminants (e.g., $SiH_4$) may form reaction products that include solid species (e.g., $SiO_2$).

Generally, solid species in a waste stream may be present as fine particles in a liquid phase (e.g., water associated with a scrubber), in the gas phase, deposited on a solid surface, or in other ways. These solid species may also nucleate directly on various surfaces. While the formation of solid reaction products may enable certain removal methods (e.g., filtration), these species may also deposit on and clog various lines, inlets, passages, surfaces, and other aspects of the system, reducing the system's efficiency or stopping its operation.

Some gas streams may include a variety of contaminants, including water-soluble, water-reactive, and water-insoluble contaminants. Scrubbing such a mixed gas stream may be particularly challenging. Many processes also create one type of contaminant during one step and another type of contaminant in another step. For example, the exhaust gas stream associated with a deposition tool may include $SiCl_4$ during a deposition step, requiring abatement of $SiCl_4$. The tool may be cleaned with a PFC during a cleaning step, and thus require abatement of the PFC. A preferred abatement system would abate all gas streams exiting a tool, and so an exemplary abatement system might be required to abate both $SiCl_4$ and the PFC.

For gas streams including a variety of contaminants, effective scrubbing may require multiple systems, such as a wet scrubber to remove water-soluble contaminants combined with a combustion chamber to combust water-insoluble contaminants. Often, the presence of one contaminant may impede the ability of a system to remove another contaminant, and for contaminants that form solid reaction products, deposition of these reaction products can be a significant problem, particularly with "downstream" systems. For example, PFCs may be removed by combustion processes in a combustion chamber, but if the incoming gas stream also contains corrosive contaminants (e.g., HCl), the materials in the combustion chamber may be attacked by the corrosive contaminants during combustion of the PFC. Additionally, combustion of the PFC may yield combustion products (e.g., $F_2$, HF or even $OF_2$) that may themselves be toxic, corrosive, and requiring of additional abatement. Combustion of $SiH_4$ may yield solid $SiO_2$ particles, which may deposit on various surfaces and clog the apparatus. Additionally, water-soluble contaminants in the gas stream entering the combustion chamber may deposit, corrode, or otherwise degrade components of the combustion chamber. Often, a preferred system or method for abating a first contaminant in a mixed gas stream creates a problem in a subsequent system for abating a second contaminant. In such situations, a system optimized for the abatement of mixed gas streams may be desired.

SUMMARY

Various embodiments include a valve for controlling a flow of a gas through a port. The valve may comprise a liquid source configured to provide a flowing liquid to the port, wherein the flowing liquid is subjected to one or more forces. Forces may be adjusted such that a first combination of forces acting on the liquid causes the liquid to substantially block the flow of gas through the port, and a second combination of forces acting on the liquid causes the liquid to allow the flow of gas through the port.

Certain aspects provide for a reaction system comprising first and second gas volumes in fluidic communication via a port, and a valve controlling a flow of gas through the port. The valve may comprise a liquid source configured to provide a flowing liquid to the port, wherein the flowing liquid is subjected to one or more forces. Forces may be controlled such that a first combination of forces acting on the liquid causes the liquid to substantially block the flow of gas through the port, and a second combination of forces acting on the liquid causes the liquid to allow the flow of gas through the port.

Other embodiments include an apparatus comprising a chamber having an inner surface and a port, and a guide surface having an edge proximate to the port, wherein the guide surface causes a flowing liquid supplied to the guide surface to traverse from the edge, across the port, to the inner surface. Such traversal may substantially close the port to passage of a gas at a first pressure through the port.

Select implementations include a reaction system for reacting a gas, which may include a chamber having an inner surface and a port, a guide surface having an edge proximate to the port, wherein the guide surface causes a flowing liquid supplied to the guide surface to traverse from the edge, across the port, to the inner surface. Such traversal may substantially close the port to passage of a gas at a first pressure through the port. A system may also include a gas inlet configured to supply a gas to the chamber via the port.

Various embodiments include one or more injectors. In some cases, an injector may include a burner. Certain embodiments provide for coating an inner surface of a chamber with a liquid. Various chambers may substantially contain a gaseous volume within a liquid "envelope" that separates the walls of the chamber from the gas phase.

Certain embodiments include a chamber having an inner surface and a port, and a guide surface having an edge, in which the edge is proximate, near, adjacent to, or associated with the port. Generally, the guide surface may cause a flowing liquid supplied to the guide surface to traverse from the edge to the inner surface, thereby substantially closing or sealing the port to passage of a gas at a first pressure through the port. Typically, the edge is close enough to the inner surface that a flowing liquid shaped by the guide surface substantially retains its shape (e.g., doesn't break up into droplets) until it reaches the inner surface. In some cases, a second pressure of the gas may cause the gas to pass through the port, which may be accompanied by a change in shape of the flowing liquid.

Some implementations include a reaction system for reacting a gas. The reaction system may comprise an apparatus including a chamber having an inner surface and a port. The apparatus may also include a guide surface having an edge, the edge proximate to the port, wherein the guide surface causes a flowing liquid supplied to the guide surface to traverse from the edge to the inner surface, thereby substantially closing the port to passage of a gas at a first pressure through the port. The reaction system may include a gas inlet such as a tube, channel or pipe that supplies a gas to the chamber via the port.

Methods and apparatus for reacting contaminants are disclosed. Methods and apparatus for abating a gas stream include a first wet scrubber configured to receive the gas stream, a reaction system connected to the first wet scrubber, wherein the reaction system is configured to react the scrubbed gas stream, and a second wet scrubber in fluid communication with the reaction system. In some embodiments, a wet scrubber may remove over 95%, preferably over 99%, and more preferably more than 99.9% of the water-soluble contaminants.

In some cases, a reaction system may include a chamber having an inner surface including a port, and a guide surface having an edge, the edge proximate to the port, wherein the guide surface causes a flowing liquid supplied to the guide surface to traverse from the edge to the inner surface, thereby substantially closing the port to passage of a gas at a first pressure through the port. Some abatement systems, reaction systems, and chambers may include an injector to create a reactive species.

Select methods include a multistep reaction of a gas stream including mixed contaminants. In some cases, a wet scrubber first removes a first species from the gas stream, a reaction system then reacts the gas stream to remove a second species from the gas stream, and another wet scrubber then scrubs the reacted gas stream. Various methods include combustion or burning of various species.

Certain embodiments include a valve operable to control a flow of gas between first and second chambers separated by a port. The valve may comprise a flowing liquid, and may be controlled by causing the flowing liquid to close the port under a first set of flow conditions.

DETAILED DESCRIPTION OF THE INVENTION

Many industrial processes require the abatement of gas streams. The fabrication of semiconductors, photovoltaic systems, and flat panel displays, as well as the chemical treatment of diverse industrial and chemical substances, may require the removal of harmful substances from a gas stream. In some cases, a gas stream may require the removal of several substances.

Various aspects control a flow of gas using a valve comprising a flowing liquid. The valve may be used with a port, and may control gas flow through the port. The flowing liquid may be configured using a first combination of forces (e.g., momentum, gravity, and pressure exerted by various gases) that causes the liquid to seal the port. A second combination of forces may result in gas passing through the port. In some cases, the flowing liquid may provide a valving apparatus that is more resistant to clogging, particularly clogging associated with species in the gas. Valves may be used with reaction chambers, and may be advantageous with reaction chambers directed toward reacting gases that lead to clogging of associated apparatus. Abatement systems comprising wet scrubbing and a reaction system may be used to abate gas streams, and may be advantageous for gas streams having different contaminants requiring different abatement reactions.

Figure 1:
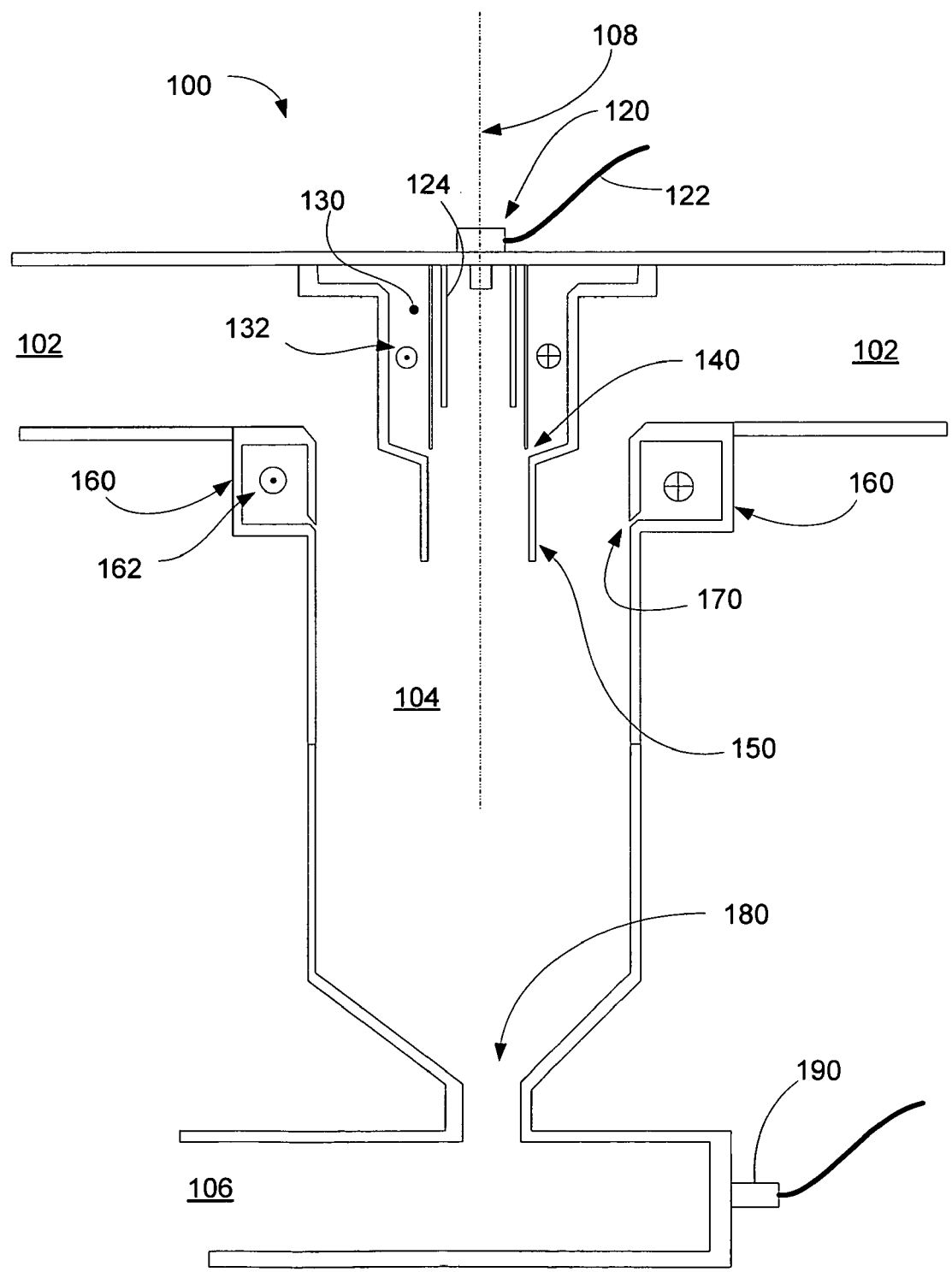
FIG. 1 illustrates an exemplary reaction system, according to various embodiments.

FIG. 1 illustrates an exemplary reaction system, according to various embodiments. Reaction system 100 may be used to react gases or gas streams, and in some cases may be used to react an effluent (or exhaust) gas stream from an industrial process. Select embodiments include various burning apparatus, and may be used to perform combustion reactions. In general, a gas stream may flow into reaction system 100 through inlet 102, react in chamber 104, and exit via outlet 106.

The schematic shown in FIG. 1 shows a cross section of reaction system 100. Some embodiments of reaction system 100 may be generally cylindrical, and in such cases, at least the upper region (e.g., above outlet 106) may be axisymmetric about axis 108. Thus, while FIG. 1 appears to have two regions annotated as inlet 102, these may be the same volume.

Reaction system 100 may be used to create a reactive environment to react at least a portion of a gas stream entering through gas inlet 102. In some embodiments, this reactive environment may be created or enhanced using injector 120. Injector 120 may inject a reactive species that reacts with the exhaust gas stream. For example, some concentrations of $SiH_4$ in an exhaust gas stream may be reacted by injecting oxygen, air or other reactive species into the gas stream. Injector 120 may inject the reactive gas at a range of velocities. Some reactions may use low injection velocities, with which a small, localized reaction region may be formed proximate to the gas injection site associated with injector 120 (somewhat akin to a "pilot light" on a burner). For other reactions, it may be preferable to choose a combination of injected gas velocity and injected species such that a "jet" is formed from injector 120, and reactions substantially occur far from injector 120 (e.g., toward the center of chamber 104).

For effluent gases requiring combustion (e.g., some PFCs), injector 120 may include a burner capable of generating a flame or other thermal jet. In certain embodiments, injector 120 may include a burner (e.g., from Hauck Manufacturing Company Lebanon, Pa.). Exemplary injector 120 includes feed 122, which may provide various gases, oxygen, fuel, electricity, communications, and other service to injector 120. In certain embodiments, feed 122 provides methane, propane, natural gas, liquid alkanes, alcohols, or other combustion fuels. Feed 122 may also include a source of oxidative gas such as air or oxygen. Feed 122 may also include an ignition source, such as a piezoelectric ignitor. For effluent gases not requiring a heat source (e.g., some gases containing $SiH_4$), injector 120 may provide oxygen without additional fuel. Injector 120 may also include an atomizer or piezoelectric injector or other apparatus to inject condensed phases such as liquid fuels into chamber 104. Injector 120 may include low and/or high velocity jets, and may be capable of creating a flame within chamber 104. Injector 120 may include a plasma generator or spark generator.

Injector 120 may also include a heat shield 124 to protect components close to injector 120 from hot gases or combustion products. Heat shield 124 may be made from an appropriate alloy, superalloy, ceramic, silicon carbide, silicon nitride or other material, and in some cases, the material choice may depend on the gas stream being reacted.

Reaction system 100 includes reservoir 130, which is a liquid reservoir. Reservoir 130 may contain water, organic liquids, solvents, or other types of liquids. Reservoir 130 may also include a circulation mechanism 132, which in exemplary FIG. 1 imparts a tangential velocity to a liquid (in reservoir 130) about axis 108. Liquid enters reservoir 130 via a supply line (not shown), and exits reservoir 130 via gap 140. Gap 140 may include various valving apparatus to control the flow of liquid out of reservoir 130. Gap 140 may be appropriately sized such that liquid flows out of reservoir 130 at a desired rate, as discussed below.

Liquid passing through gap 140 generally flows down guide surface 150. For axisymmetric versions of reaction system 100, guide surface 150 may be approximately cylindrical or conical in shape (as viewed from above). Generally, gap 140 is designed such that the velocity of the liquid in reservoir 130 is maintained as the liquid passes from reservoir 130 to guide surface 150.

Reaction system 100 may also include reservoir 160. Reservoir 160 is designed to contain a liquid, and in some cases reservoir 160 may contain a liquid that is similar to or the same as the liquid in reservoir 130. In certain embodiments, reservoir 160 and reservoir 130 may contain different liquids, and in select embodiments, the choices of liquids may include the relative wettability (or affinity) of one liquid to the other.

Reservoir 160 includes a supply line (not shown) which supplies liquid to the reservoir 160. Reservoir 160 also includes gap 170 from which liquid flows out of reservoir 160. Gap 170 may also include various valving apparatus to control the flow of liquid out of reservoir 160. The flow rate of liquid into reservoir 160 and the width of gap 170 may be such that the liquid substantially coats the walls of chamber 104 after it exits reservoir 160. Reservoir 160 optionally includes circulation mechanism 162, which imparts a tangential velocity (about axis 108) to a liquid contained in reservoir 160. In certain embodiments, circulation mechanism 162 may impart sufficient tangential velocity to a liquid in reservoir 160 that the tangential velocity is maintained after the liquid has passed through gap 170. In such cases, the liquid may "swirl" down the walls of chamber 104.

Liquids and gases may exit chamber 104 via drain 180. Reaction system 100 includes a quencher 190. Quencher 190 may include a spray nozzle to inject gas and/or liquid into the region associated with drain 180 and outlet 106. In some cases, an injected gas or liquid may be used to cool the species exiting chamber 104. For example, if injector 120 is operated as a burner to combust a gas species in chamber 104, quencher 190 may include a nozzle to inject a cooling spray of water. In some cases, quencher 190 is oriented such that the velocity of the species injected by quencher 190 aids the passage of gases and liquids from drain 180 to outlet 106. Quencher 190 may be omitted in some embodiments.

Choices of materials used for various components may depend on several factors, including the chemical nature of the gas stream being reacted and various temperatures that components must withstand. In some embodiments, various components may be fabricated from different materials in different regions. For example, reservoir 130 may be fabricated from an inert material such as poly-tetra-fluoro-ethylene (PTFE) in the region disposed adjacent to gas inlet 102. The wall of reservoir 130 facing injector 120, however, may be fabricated of a metal or other high thermal conductivity material, such that the liquid circulating inside reservoir 130 efficiently removes heat from the walls of the reservoir 130.

Figure 2:
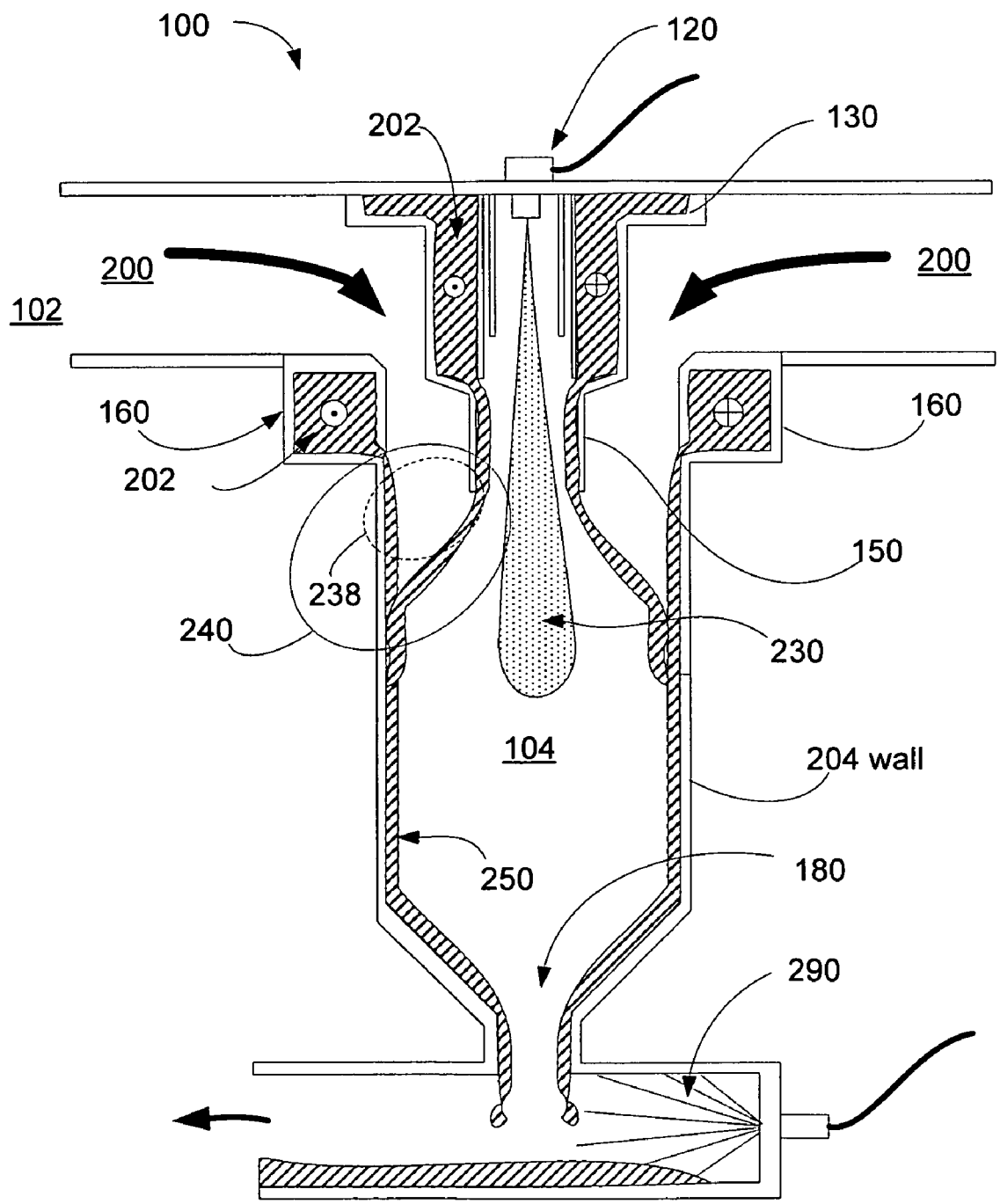
FIG. 2 is a schematic that shows a way of operating a reaction system.

FIG. 2 is a schematic that shows a way of operating a reaction system. In this example, reaction system 100 operates to combust gas stream 200 in reaction chamber 104, thereby removing certain species from gas stream 200. In this example, a single type of liquid 202 (e.g., water) is used in both liquid reservoirs 130 and 160.

The separation of gaseous volumes (e.g., the gas associated with gas inlet 102 from the gas within chamber 104) generally occurs in a region associated with the edge of guide surface 150 and a proximate surface (e.g., an area of wall 204). As such, this region can be thought of as a "port" into chamber 104 from gas inlet 102, and is annotated as port 238.

By appropriate choice of liquid flow rate into reservoir 130, circulation mechanism 132 (FIG. 1), and gap 140 (FIG. 1), a liquid flowing out of reservoir 130 via gap 140, having a tangential velocity (about axis 108, FIG. 1), may substantially maintain its tangential velocity as it flows down guide surface 150 (in some cases, following a substantially helical path).

In some embodiments, a liquid may "swirl" down guide surface 150, and circulation mechanism 132 imparts sufficient momentum to the liquid exiting gap 140 that the swirling liquid (having exited gap 140) tends to exert an outward force on guide surface 150, which thus "contains" the swirling liquid horizontally while the liquid is in contact with guide surface 150.

By creating the aforementioned tangential velocity in the liquid 202 exiting reservoir 130, the momentum of the flowing liquid may be manifest as a radially "outward" force that carries the liquid toward the wall 204 of chamber 104. By choosing an appropriate flow rate (including volume and velocity) for the liquid, a substantially continuous and somewhat "conical" sheet of liquid may be created between guide surface 150 and wall 204. This "nose cone" shaped liquid may operate as a valve 240, substantially separating the gas phase of the inlet 102 from that of the chamber 104. As such, valve 240 can be operated to either block the flow of gas through port 238 or allow the flow of gas through port 238. The flow rate of gas through port 238 may be controlled by controlling aspects of valve 240 such as flow rate, circulation rate, flow volume, and other factors associated with the flow of liquid 202 past guide surface 150. Flow rate may also be controlled by controlling gas pressure in either or both of inlet 102 and chamber 104.

The flowing liquid of valve 240 is typically acted on by a combination of forces. These forces generally include gravity and a force associated with the momentum of the liquid itself. Forces on the liquid may also include the surface tension between the liquid and various gas phase. Forces may include an interaction between the liquid and solid surfaces such as guide surface 150 (e.g., surface tension or a shear force associated with such an interface).

Valve 240 may substantially separate the gas species in chamber 104 from those in inlet 102, providing for gas phase reactions in chamber 104 in which the reaction products are substantially separated from inlet 102. As such, valve 240 may substantially isolate chamber 104 from associated upstream components. In some embodiments, such a configuration may reduce the deposition on and/or corrosion of upstream components.

Liquid 202 flowing from reservoir 130 may completely coat various walls 204 of chamber 104. In some embodiments, additional liquid 202 flows from reservoir 160 down wall 204. The flow rates of liquid 202 from reservoirs 130 and optionally 160 may be chosen such that liquid 202 coats the wall 204 of chamber 104, creating a dynamic, continuously replenished liquid surface that separates the gaseous species within chamber 104 from the structural components of chamber 104. In some cases, flowing liquids 202 continually sweep the wall 204, preventing the deposition of solid species on wall 204. Corrosion of components such as wall 204 may be substantially mitigated by the layer of flowing liquid coating these components.

Hot gases flowing out of the reaction system 100 of FIG. 2 may be partially cooled and scrubbed by quencher 290, which may include a water spray.

In certain aspects, the combination of various liquid flows, high velocity injection from injector 120, and valve 240, may create a "liquid envelope" that contains the gas phase of chamber 104, thereby protecting the components of chamber 104 from reactive gases or deposits. Reactive jet 230 may create a reactive volume in which exhaust gases react. The reaction products may be swept out via drain 180. Solid reaction products such as particles may be entrained in the liquid phase and swept out of chamber 104, rather than deposited on solid surfaces. Corrosive exhaust gases or corrosive reaction products may be separated from solid surfaces by the flowing liquid layers. Back-diffusion of reaction products from chamber 104 toward gas inlet 102 may be prevented by valve 240, which may minimize clogging of inlet 102.

In some embodiments, injector 120 may be operated as a burner, and may inject a reactive jet 230, which may include a plasma or flame. Injector 120 may be operated as a high temperature burner, burning gaseous species at over 1000, 2000, 3,000 or even 4,000 degrees Celsius. For some applications, the flow rates and injected species associated with injector 120 may be chosen such that reactive jet 230 is emitted from injector 120 at a high enough velocity that a reactive plume is formed in the center of chamber 104, far from injector 120. Liquids 202 may substantially cool the solid and gaseous phases they contact. Hot, reactive species within chamber 104 may be separated from structural components (e.g., walls 204) by various flowing liquid layers. The flowing liquid may insulate structural components from a hot reactive jet 230 and also remove heat from chamber 104.

In certain embodiments, injector 120 injects reactive species at high enough velocities that gas phase "back diffusion" from chamber 104 toward injector 120 is minimized, and reactions associated with reactive jet 230 substantially occur within chamber 104, rather than in the region near injector 120, heat shield 124 (FIG. 1) or reservoir 130 (FIG. 1). In other cases, reactive jet 230 may be a small jet located adjacent to injector 120 (e.g., more like a "pilot light").

In some embodiments, reactive jet 230 may heat components of reaction system 100 (e.g., walls 204). Typically, such temperatures might require a chamber fabricated from an appropriate high temperature material (e.g., high temperature steel, superalloy, hastelloy, inconel and the like). In some embodiments, heat removal by the flowing liquid may be sufficient that various components (e.g., chamber 104) may be constructed from materials that might not otherwise resist these high temperatures, such as PVC, PET, polypropylene, polycarbonate, PETE, PTFE and other plastics. Such materials may offer improved corrosion resistance, particularly with respect to dissolved species in the flowing liquid in contact with the component. Some materials may be transparent, which may provide for optical measurements of reactions in chamber 104. Flowing liquids 202 may also minimize the deposition of particulate species on solid surfaces (e.g., walls 204), particularly when these species result from a reaction within chamber 104.

Figure 3A:
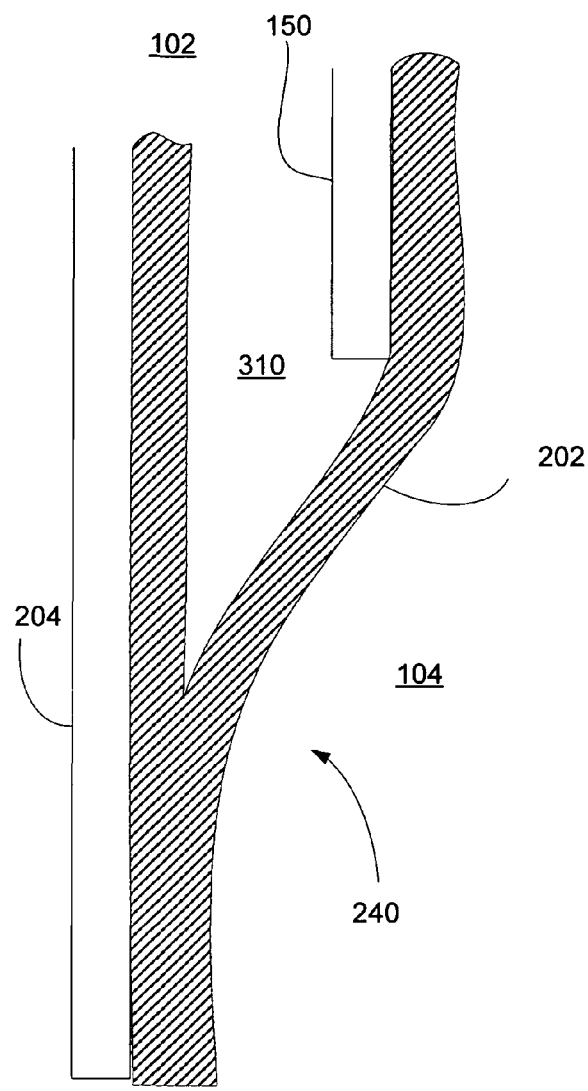
FIGS. 3A and 3B illustrate closed and open positions of a valve, according to certain embodiments.
Figure 3B:
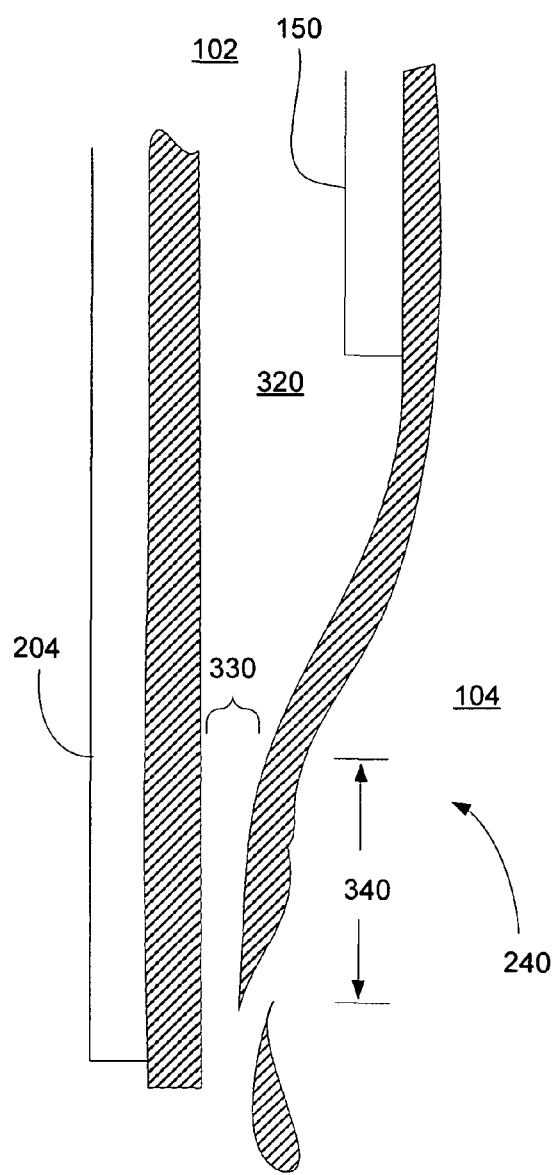

FIGS. 3A and 3B illustrate closed and open positions of a valve according to certain embodiments. These figures show how exemplary valve 240 may operate as a valve to separate chamber 104 from inlet 102. The example in FIG. 3A and FIG. 3B uses liquid flow from both reservoirs 130 (FIG. 1) and 160 (FIG. 1), although valve 240 may alternatively operate without liquid flowing from reservoir 160. In FIG. 3A, inlet 102 contains a gas 310 at a first pressure which is approximately equal to the pressure within chamber 104. As such, the liquid 202 flowing from guide surface 150 to wall 204 substantially contacts the liquid flowing down wall 204 from reservoir 160. These liquid "sheets" substantially seal to each other, and generally prevent the passage of gas from inlet 102 to chamber 104, and vice versa. In FIG. 3B, inlet 102 contains a gas 320 at higher pressure than that of gas 310, and generally gas 320 is also at a higher pressure than that of chamber 104. As such, the increased pressure of gas 320 "opens" valve 240, allowing passage of gas 320 into chamber 104.

By choosing a suitable flow rate, velocity, and volume of liquid 202 flowing from reservoir 130, the "opening" and "closing" conditions of valve 240 may be adjusted to accommodate a desired pressure difference between the inlet 102 and chamber 104. Some forces (e.g., the momentum of the liquid) may be controlled; other forces (e.g., gravity) may be generally uncontrolled. A first combination of forces may be chosen that causes valve 240 to "open" and a second combination of forces may be chosen that causes valve 240 to "close." For example, a higher momentum might cause the liquid associated with valve 240 to block the flow of gas through port 238 (FIG. 2), and a lower momentum might cause the liquid associated with valve 240 to allow gas to pass through port 238. In some aspects, it may be advantageous to characterize the momentum of the liquid as a vector field. In certain aspects, the shape of the flowing liquid that is traversing the region from the edge of guide surface 150 to wall 204 may be described by or associated with field lines that characterize the forces acting on the liquid.

Valve 240 may be closed by subjecting liquid 202 to a first combination of forces; valve 240 may be opened by subjecting liquid 202 to a second combination of forces. Such opening and closing may result (for example, and without limitation) due to an increase (closing) or decrease (opening) in the flow rate associated with liquid 202, or with an increase (opening) or decrease (closing) in the pressure of gas 310/320 (or similarly, via a reduction in pressure within chamber 104).

In certain embodiments, the passage of gas 320 through open valve 240 is via a gap having width 330 and length 340, as shown in FIG. 3B. By choosing appropriate flow, velocity and volume conditions, the length 340 may be made larger than width 330, which may substantially prevent the back-diffusion of gas from chamber 104 to inlet 102.

In some aspects, valve 240 may behave like a "duckbill valve," in that it substantially allows flow in one direction, prevents flow in the opposite direction, and may operate via changes in pressure on one side or the other. The operable part of valve 240, however, may be substantially liquid rather than solid. As such, the valve itself is continually replenished and any reaction products that may be formed are continually swept out of chamber 104. For some reaction chambers, particularly chambers used to combust PFCs, valve 240 may be more resistant to clogging than typical valves.

In some embodiments, systems including reaction system 100 (FIG. 1) may be particularly useful for reacting gas streams containing PFCs. Often, PFCs are combusted, and combustion may create $F_2$, and/or HF. These species may be very corrosive to the combustion environment, and so preventing their contact with incompatible materials may increase the service life of the apparatus. Additionally, by choosing a liquid 202 that dissolves reaction products, scrubbing of the reaction products may begin within chamber 104. In some cases, liquid 202 may be controlled to have a pH>6, and preferably >7. Some reactions may form $OF_2$, and minimizing the creation of $OF_2$ may entail the use of chemical conditions that are deleterious to various structural materials.

In certain embodiments, reaction system 100 may be combined with a wet scrubber situated downstream of reaction system 100. Reaction system 100 may be used to react certain components of a gas stream, and the downstream scrubber may then be used to remove the reaction products formed in reaction system 100. In those instances involving gas streams containing at least first and second contaminants, downstream operation of such a wet scrubber to scrub a first contaminant may be substantially improved when an upstream apparatus (e.g., including reaction system 100), removes more than 90%, 99%, 99.9%, or even 99.99% of the second contaminant prior to passage of the gas stream to the wet scrubber.

Figure 4:
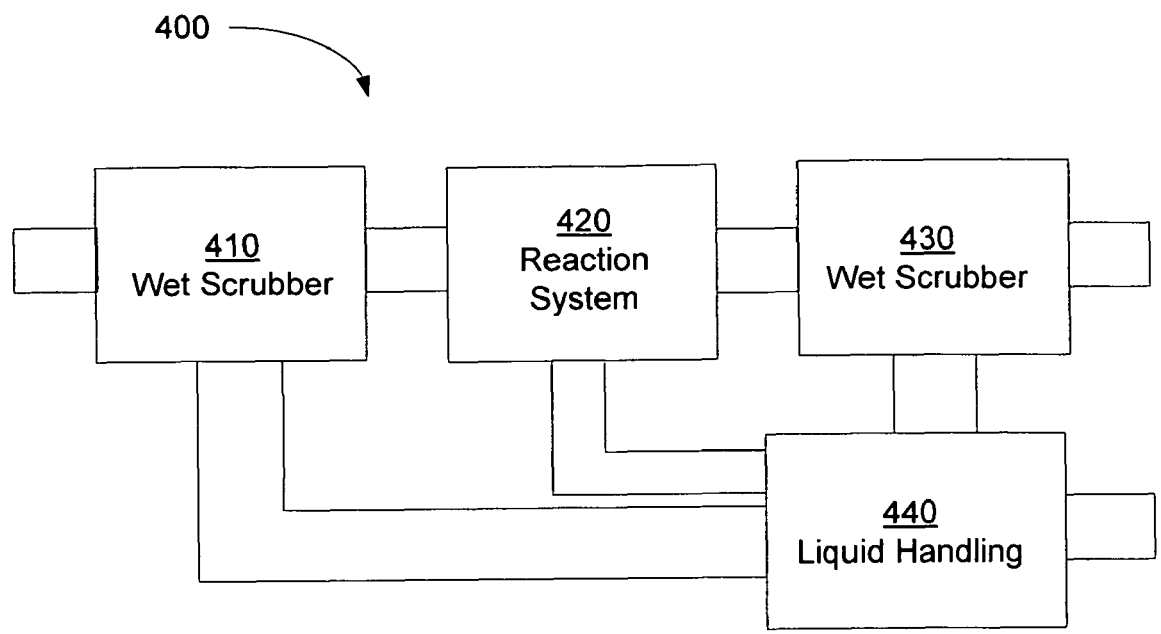
FIG. 4 is a diagrammatic representation of an exemplary system that may be used to perform a multi-step abatement process, according to some embodiments.

FIG. 4 is a diagrammatic representation of an exemplary system that may be used to perform a multi-step abatement process, according to some embodiments. Such a system may be particularly useful for abating a mixed-contaminant gas stream, particularly a stream comprising mixtures of water-soluble, water-reactive, and/or water-insoluble contaminants. Abatement system 400 includes wet scrubber 410, reaction system 420, wet scrubber 430, and liquid handling system 440. Generally, exhaust gas streams may flow through abatement system 400 from left to right as shown. An exhaust gas stream may first be scrubbed of water-soluble contaminants in wet scrubber 410. It may be advantageous to use a wet scrubber that removes at least 90%, preferably 99%, still more preferably 99.9%, and even 99.99% of the water-soluble contaminants from the gas stream, in that their removal prior to subsequent reaction systems may improve performance of those systems.

The scrubbed gas stream may then be reacted in reaction system 420. Reaction system 420 may include a reaction system such as reaction system 100. Reaction system 420 may alternately include a conventional reaction chamber or a burner system. Generally, reaction system 420 may be used to react the scrubbed gas stream to convert remaining contaminants (that passed through the first wet scrubber) into reaction products that can be removed by subsequent wet scrubbing. The reacted gas stream may then pass to wet scrubber 430. In this example, separate wet scrubbers 410 and 430 are shown, although the system may be designed such that a single wet scrubber is used.

For embodiments in which reaction system 420 includes a system such as reaction system 100, reaction system 420 may generate substantial amounts of liquid. In such cases, it may be advantageous to include a separate liquid handling system 440. In liquid handling system 440, liquids associated with reaction system 420 may be treated to remove contaminants. Liquid handling system 440 may also provide liquids to any of wet scrubber 410, reaction system 420, and wet scrubber 430, as well as handle liquids received from these systems.

Figure 5:
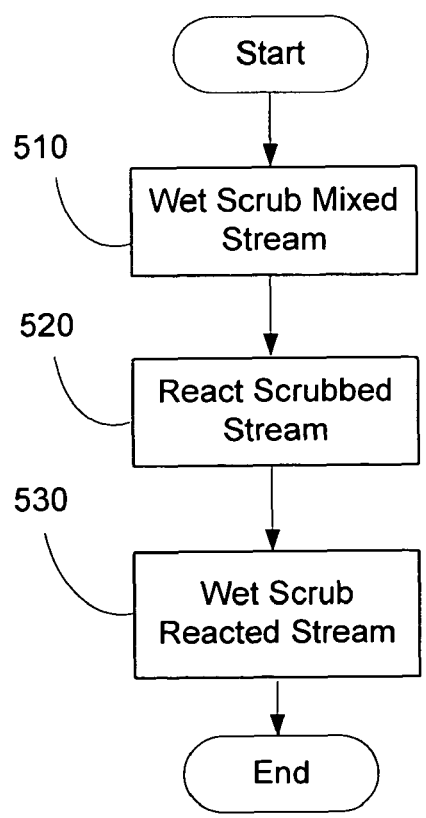
FIG. 5 illustrates several steps in an abatement process according to certain embodiments.

FIG. 5 illustrates several steps in an abatement process according to certain embodiments. Some gas streams may be abated by combining several systems in series and reacting the gas stream sequentially. In step 510, a wet scrubber substantially removes water soluble contaminants from the gas stream. In a preferred embodiment wet scrubber thoroughly scrubs the gas stream (i.e., removes at least 90%, 99%, 99.9%, 99.99%, or even 99.999% of the water-soluble contaminants from the gas stream). In step 520, the scrubbed gas stream is reacted in a reaction system to remove at least a portion of the remaining contaminants. Reaction system 100 may be used for such a step, although other systems capable of reacting such contaminants may also be used. Various embodiments include a reaction system other than reaction system 100, and the use of such systems may be improved when the gas stream has been thoroughly scrubbed of water-soluble contaminants prior to reaction. In step 530, the reacted gas stream is introduced into a wet scrubber (which may be the same or different as the wet scrubber used in step 510). In step 530, the reacted gas stream may be scrubbed of water soluble reaction products resulting from the reactions of step 520.

Figure 6:
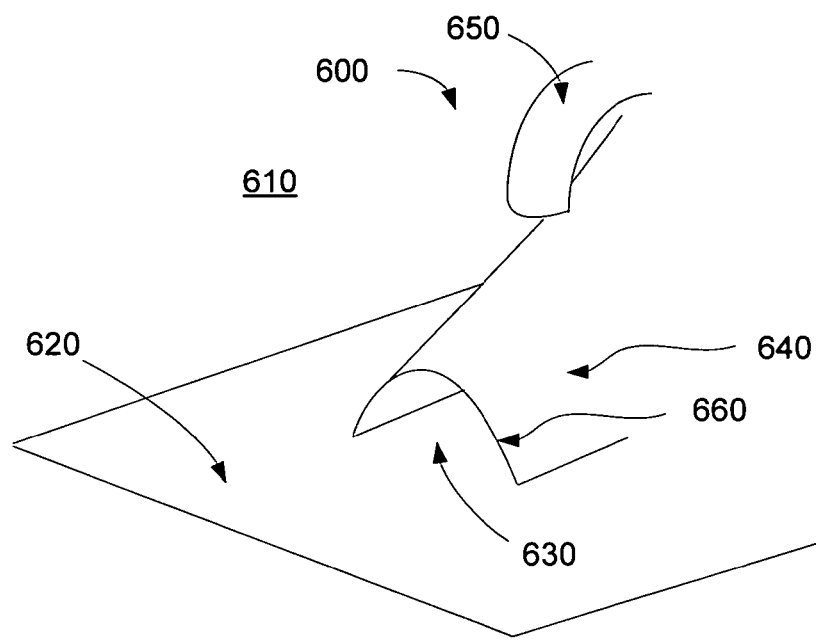
FIG. 6 is a diagrammatic representation of another embodiment

FIG. 6 is a diagrammatic representation of another embodiment. Apparatus 600 may be used to control a flow of gas into a chamber 610, which includes an inner surface 620. In this example, gas enters chamber 610 through port 630. Guide surface 640 is configured to guide (e.g., change the trajectory, momentum, or direction) and otherwise "shape" a liquid supplied by liquid supply mechanism 650. Liquid supply mechanism 650 provides a flowing liquid to guide surface 640, and may include a pipe, tube, valve, nozzle, orifice, or other shaped liquid outlet. Liquid supply mechanism 650 may include a tube, pipe, reservoir or other liquid delivery and/or storage system, and liquid supply mechanism 650 may include a pump, or other apparatus to deliver a flowing liquid. Liquid supply mechanism 650 may include the use of gravity to apply a force to the liquid. The flowing liquid substantially flows over edge 660 and traverses port 630 from edge 660 to inner surface 620. Edge 660 is proximate to inner surface 620, i.e., far enough that gas can flow through port 630, yet close enough that a "sheet" of liquid flowing from edge 660 to inner surface 620 substantially retains its "sheet" configuration, rather than being disrupted or broken up by turbulence, frictional forces with the gas phase, surface tension and the like.

In some embodiments, guide surface 640 is shaped such that at a first flow rate of a liquid supplied by liquid supply mechanism 650, the liquid prevents gas flow through port 630 by forming a curvilinear "sheet" of liquid that substantially seals port 630. At a reduced liquid flow rate or an increased pressure of gas "behind" port 630, gas may flow through the port into chamber 610. Guide surface 640 may also include smoothing structures (e.g., rounded corners) at the intersection between guide surface 640 and inner surface 620.

Figure 7:
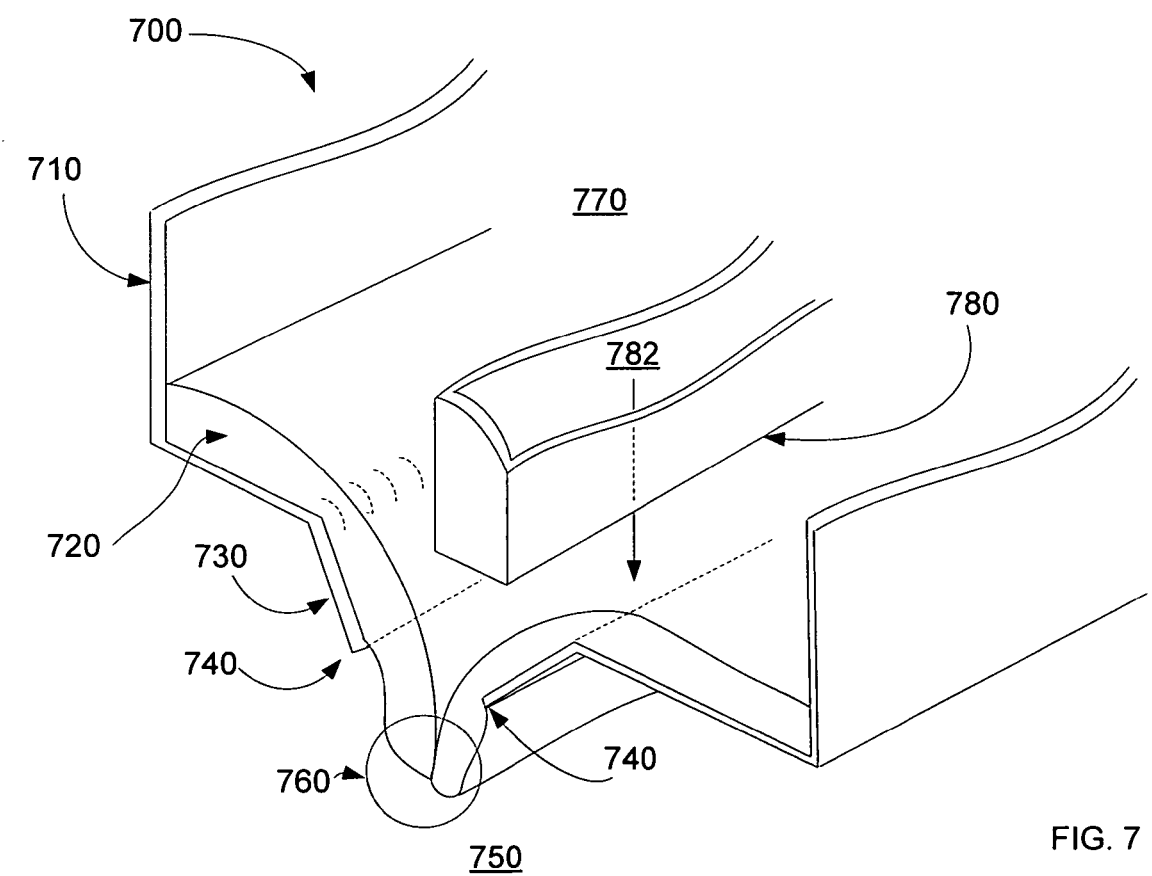
FIG. 7 is a diagrammatic representation of a further embodiment.

FIG. 7 is a diagrammatic representation of a further embodiment. Apparatus 700 comprises liquid containment 710, which contains liquid 720. Means to supply and cause a flow of liquid 720 may be included, but are not shown. Liquid containment 710 includes one or more guide surfaces 730 and edges 740, and may also include other structural features to guide and/or change a momentum of liquid 720. Opposing sheets of liquid 720 may traverse from edges 740 into a chamber 750 (whose volume is annotated, but not its boundaries) or other volume below apparatus 700. An appropriate choice of flow rate and geometry may be used to create valve 760, which may operate to separate chamber 750 from a volume 770 "upstream" of valve 760. Edges 740 may create a port into chamber 750, which may be sealed by valve 760.

Apparatus 700 may include an inlet 780, which may be operated to direct a gas toward and/or through valve 760 (e.g., by emitting a gas in direction 782). In some embodiments, a gas or other fluid may be injected into valve 760 such that the injected gas opens valve 760, allowing the gas to pass into chamber 750. In some cases, valve 760 may be operated as a "duckbill" valve, which may reduce back-diffusion of species from chamber 750 into inlet 770. Inlet 780 may be positioned above, within, and/or below valve 760. In some cases, liquid associated with valve 760 substantially coats inlet 780. Inlet 780 may provide process gas, exhaust gas, reactive gas, treatment gas, and/or other species. Inlet 780 and/or another component of apparatus 700 may include an injector (not shown), and in some cases, a burner.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus comprising:
a chamber having an inner surface;
a guide surface having a cylindrical shape with an interior face and terminating at an edge;
a port formed from at least a portion of the inner surface proximate to the edge, the port connecting a gas inlet to the chamber;
a first reservoir configured to deliver a first liquid to the interior face of the guide surface via a gap between the first reservoir and the guide surface, the first liquid delivered at a first flow rate; and
a first circulation mechanism associated with the first reservoir and configured to impart a tangential velocity to the first liquid such that the first liquid swirls around the interior face of the guide surface in passing from the gap to the edge;
wherein the shape of the guide surface and the first flow rate of the delivered first liquid flowing over the guide surface cause the first liquid to flow past the edge to the inner surface, such that the first liquid forms a liquid membrane that prevents a flow of gas through the port under a first pressure difference between gas pressures in the chamber and the gas inlet.

2. The apparatus of claim 1, wherein the liquid membrane allows a flow of gas through the port under a second pressure difference greater than the first pressure difference.

3. The apparatus of claim 1, further comprising an injector configured to inject a reactive jet into any of the inlet and the chamber.

4. The apparatus of claim 3, wherein the injector includes a burner.

5. The apparatus of claim 3, wherein the injector is configured to inject an oxidative species.

6. The apparatus of claim 1, further comprising a second reservoir configured to deliver a second liquid to coat at least a portion of the inner surface.

7. The apparatus of claim 1, wherein the shape of the guide surface is cylindrical about a vertical axis, at least a portion of the inner surface is concentric with the axis, and the edge includes a circular bottom edge of the guide surface.

8. The apparatus of claim 7, wherein the concentric portion is characterized by a diameter larger than a diameter characterizing the bottom edge.

9. The apparatus of claim 8, wherein the liquid membrane flows from the edge to the concentric portion of the inner surface.

10. The apparatus of claim 1, wherein the port is ring-shaped.

11. The apparatus of claim 1, wherein the liquid membrane is approximately conical in shape.

12. A method of abating a gas stream, the method comprising:
providing an apparatus including:
a chamber having an inner surface,
a guide surface having a shape and an edge,
a port formed from at least a portion of the inner surface proximate to the edge, the port connecting a gas inlet to the chamber, and
a first reservoir configured to deliver a first liquid to the guide surface at a first flow rate,
wherein the shape of the guide surface and the first flow rate of the delivered first liquid flowing over the guide surface cause the first liquid to flow past the edge to the inner surface, such that the first liquid forms a liquid membrane that prevents a flow of gas through the port under a first pressure difference between gas pressures in the chamber and the gas inlet;
delivering the first liquid at the first flow rate;
delivering the gas stream to the chamber via the gas inlet, the chamber and gas inlet characterized by a second pressure difference between the chamber and gas inlet that causes the liquid membrane to allow a flow of the gas stream through the port; and operating the apparatus to abate the gas stream delivered to the chamber.

13. The method of claim 12, wherein the gas stream includes any of a water-reactive and a water-insoluble contaminant, and the first liquid includes water.

14. The method of claim 12, wherein at least a portion of the guide surface is cylindrical, and delivering the first liquid includes swirling the first liquid around the cylindrical portion of the guide surface.

15. The method of claim 12, further comprising delivering a second liquid to coat at least a portion of the inner surface.

16. The method of claim 12, wherein delivering the first liquid includes forming a liquid envelope within the chamber, and the gas stream is delivered to an interior of the liquid envelope.

17. The method of claim 12, further comprising injecting a reactive species into any of the gas inlet and the chamber, the reactive species chosen to react with at least a portion of the gas stream.

18. A method of reducing a concentration of first and second contaminants in a gas stream, the method comprising:
   wet scrubbing the effluent gas stream in a wet scrubber to reduce the concentration of the first contaminant;
   delivering the wet scrubbed gas stream to a gas inlet of apparatus comprising:
      a chamber having an inner surface,
      a guide surface having a shape and an edge,
      a port formed from at least a portion of the inner surface proximate to the edge, the port connecting the gas inlet to the chamber, and
      a first reservoir configured to deliver a first liquid to the guide surface at a first flow rate;
      wherein the shape of the guide surface and the first flow rate of the delivered first liquid flowing over the guide surface cause the first liquid to flow past the edge to the inner surface, such that the first liquid forms a liquid membrane that prevents a flow of gas through the port under a first pressure difference between gas pressures in the chamber and the gas inlet;
   delivering the first liquid at a first flow rate that forms the liquid membrane;
   controlling a pressure associated with any of the gas inlet and the chamber to create a pressure difference between the gas inlet and the chamber that provides for passage of the wet scrubbed gas stream into the chamber via the port; and
   reacting the delivered gas stream to reduce the concentration of the second contaminant.

19. The method of claim 18, wherein the guide surface includes a cylindrically shaped interior face, the first liquid is delivered to the interior face with a tangential velocity that causes the first liquid to spiral down the interior face past the edge, and the liquid membrane is approximately conical in shape.

20. The method of claim 18, wherein the first contaminant includes a water-soluble contaminant, and the second contaminant includes any of a water-insoluble and a water-reactive contaminant.

* * * * *